Nov. 3, 1970     H. ARENSON     3,537,125
CASTER WITH INTEGRAL HORN AND PINTLE AND METHOD OF MAKING SAME
Filed Oct. 25, 1967
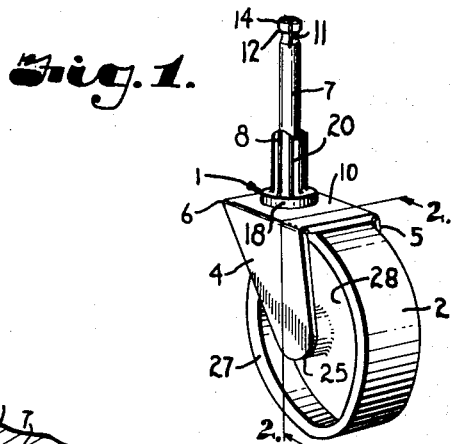
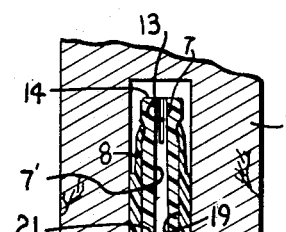
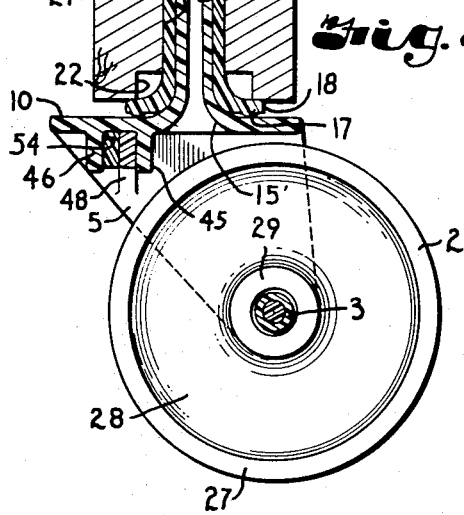
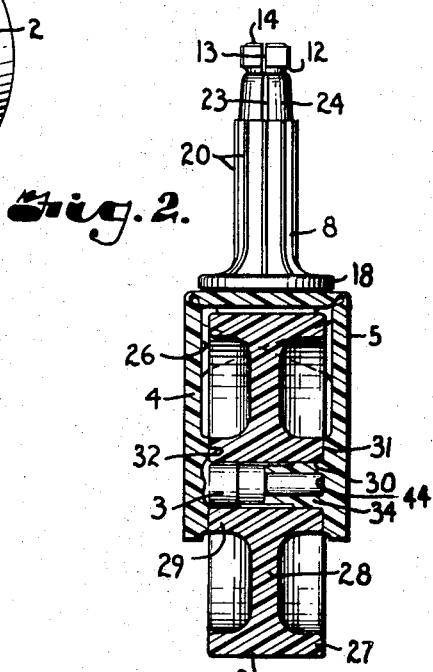
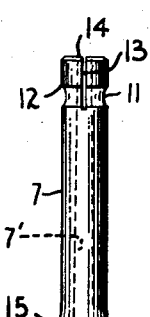
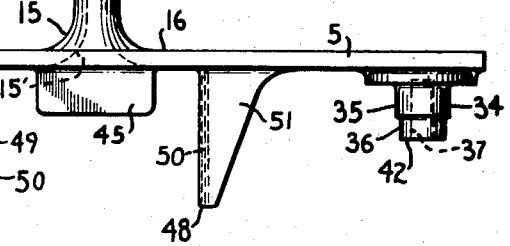
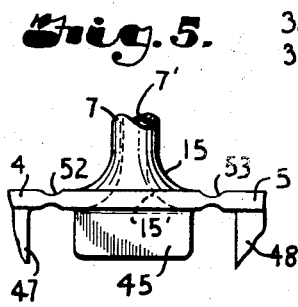
INVENTOR.
HERBERT ARENSON
BY Fishburn, Gold & Litman
ATTORNEYS United States Patent Office 3,537,125
Patented Nov. 3, 1970

3,537,125
CASTER WITH INTEGRAL HORN AND PINTLE
AND METHOD OF MAKING SAME
Herbert Arenson, Shawnee Mission, Kans., assignor to United States Caster Corporation, Overland Park, Kans., a corporation of Missouri
Filed Oct. 25, 1967, Ser. No. 677,905
Int. Cl. B60b 33/00
U.S. Cl. 16—31                            9 Claims

ABSTRACT OF THE DISCLOSURE

A caster of molded parts and method of making same wherein the caster includes an integral pintle and horn with arms extending therefrom with an axle extending between the arms and mounting a wheel. A mounting member for supporting the pintle in the leg of furniture or the like, such as a sleeve having resiliently inwardly extending portions engaging a shoulder on the pintle to retain the sleeve and pintle assembled. The method, including the molding of the pintle and horn in an integral structure with the horn and arm portions in a flat strip preferably having axle portions and connector members extending therefrom, coining the horn in spaced transverse lines on each side of the pintle, placing a wheel on an axle portion, and bending the horn at the coined lines to move the arms into parallel relation with the securing portions engaged and the axle portions aligned with the wheel thereon, and electronically welding the axle portions together onto the arms to hold the assembly, said molded portions being of a suitable shock and wear resistant material such as acetal resin or nylon.

---

Caster structures heretofore used have included plastic wheels or plastic bearing members but the pintle and horn have been formed of metal. Usually the upper plate of the horn has a hole through which a portion of the pintle extends with the lower part of the pintle staked. Also, very rigid horn structures have been utilized because the loading on a caster is spaced from the axis of the wheel and excessive deflection will subject the metal to a permanent deflection and render the caster useless.

The principal objects of the present invention are to provide a caster structure of molded plastic parts including an integral pintle and horn; to provide such a structure of wear resistant, shock absorbing material with the portions connected to cooperate in resisting loads, the resilience of suitable plastic material enabling the caster assembly to absorb shocks and instantly return to normal shape; to provide such a structure and method of making same wherein the pintle and horn is molded with the horn and arms thereof in a flat strip, the pintle extending in one direction and axle portions and fastening means extending in the other direction, the horn then being coined in spaced transverse lines and bent thereon to arrange the arms in parallel relation; to provide such a method wherein in the bending of the arms the anchoring means are engaged and the axle portions aligned with a wheel placed on the axle portions and then the structure electronically welded or mechanically joined at the axle portions to retain the arms in operative position with the wheel therebetween; to provide such a caster structure with a pintle having a shoulder thereon and a sleeve rotatably mounted on the pintle with resilient portions engaging the shoulder to retain the sleeve in assembled position; to provide such a structure wherein the pintle is rotatably mounted in the sleeve and the sleeve is adapted to be mounted in the leg of furniture or the like, said sleeve having portions engaging said leg to prevent relative rotation; to provide such a structure wherein the sleeve has an annular flange with bearing portions thereon engaging the bight of the caster horn radially outwardly from the axis of the pintle; and to provide a caster structure and method of making same of plastic that is economical for quantity production of a caster that is sturdy, long wearing and shock resistant.

Other objects and advantages of this invention will become apparent from the following description taken in connection with the accompanying drawings wherein are set forth by way of illustration and examples certain embodiments of this invention.

FIG. 1 is a perspective view of a caster embodying the features of the present invention with portions of the sleeve broken away to show the upper portion of the pintle.

FIG. 2 is a view of the caster with a transverse section through the horn and wheel taken substantially on the line 2—2, FIG. 1.

FIG. 3 is a sectional view through the caster and mounting in a furniture leg.

FIG. 4 is an elevational view of a molded integral pintle and horn structure prior to forming.

FIG. 5 is a partial elevational view of the pintle and horn showing the horn after coining.

Referring more in detail to the drawing:

The reference numeral 1 generally designates a caster structure including a wheel 2 rotatably mounted on an axle 3 carried by arms 4 and 5 of a horn 6 having an upstanding pintle 7 thereon. The pintle is rotatably mounted in a suitable bearing member such as a sleeve 8 adapted to be secured in a bottom of a piece of furniture or other article to be supported, as for example, in a leg 9 of such an article. While the axle 3 may be a separate assembly onto the arms 4 for supporting the wheel, it is preferred that the axle portions be integral with the horn and pintle structure for resulting strength as well as economy in manufacture. The pintle 7 is integral with the horn and extends upwardly from the bight or plate portion 10 thereof. While the pin or pintle 7 may take different forms, it is preferred that it be an elongate cylindrical member relatively small in diameter whereby it can be mounted into small leg structures and the like, as for example, the diameter may be between ¼ to ⅜ inches. The upper portion of the pintle preferably has circumferential groove 11 forming a downwardly facing shoulder 12 for aiding in retaining the assembly of the caster to a sleeve 8, as later described. A slot 13 extends longitudinally of the pintle from the end 14 to slightly beyond the circumferential groove 11, said slot permitting the end portion to compress inwardly for ejection from a mold. The lower end of the pintle merges into the bight or plate 10 and has a substantial radius as at 15, said radius preferably being in the nature of one-half the diameter to equal the diameter of the pintle. The upper face 16 of the plate portion extends outwardly from the radius and is substantially flat to provide a bearing surface adapted to be engaged by spaced bearing points 17 on the underface of an annular flange 18 of the sleeve 8. The pintle is preferably hollow having a through bore 7' that merges with an underface by a radius as at 15'.

In the illustrated structure, the sleeve has a cylindrical bore 19 adapted to rotatably mount the pintle 7 and has circumferentially spaced radially outwardly extending ribs 20 arranged longitudinally of the sleeve and adapted to engage in the bore 21 in a leg 9 of an article to be supported, the article preferably having a counterbore 22 at the lower end smaller than the diameter of the flange 18 and of a depth whereby the bore engages the cylindrical portion of the sleeve with the ribs 20 retaining the sleeves against rotation. The upper portion of the sleeve is preferably of reduced diameter and slotted as at 23 to provide fingers 24 having a normal position at the upper ends defining a diameter less than the diameter of the pintle whereby the upper ends of the fingers extend into the groove 11 and engage the shoulder 12.

The arms 4 and 5 of the horn extend from opposite sides of the plate 10 in substantially parallel relation, said arms being progressively of lesser width with each terminating in a rounded end 25 preferably on a radius from the axis of the axle. The spacing between innerfaces 26 of the arms is such that the wheel 2 is freely movable therebetween, the wheel having a rim portion 27 connected by a web 28 with a hub 29 having a bore 30 adapted to receive the axle member 3 in rotatably mounting the wheel thereon. The ends of the hub preferably have faces 31 engaging innerfaces 32 of bosses 33 to limit endwise movement of the wheel relative to the axle.

The axle may be fixed to one arm and then secured to the other after assembly or may be in parts on each arm. In the illustrated structure, an axle portion 34 is on the arm 5 and has a bearing portion 35 terminating in a reduced diameter portion 36, said axle portion extending from the boss 33 and having an axial bore 37 extending therein from the free end of the axle portion. The axle portion 38 on the arm 4 has a bearing portion 39 and a reduced portion 40 with an end face 41 adapted to engage the end face 42 of the axle portion 34, when in assembled position. The axle portion 38 has a pin 43 extending therefrom adapted to extend into the bore 37 to substantially the end thereof, and after assembly, the pin 43 is electronically welded or mechanically joined at its end to the arm 5 as at 44 to form a rigid structure.

The arms 4 and 5 are further held in position and braced relative to the plate portion 10 by an assembly of brackets and flanges. The plate portion 10 has transverse depending flanges 45 and 46 with the spacing therebetween adapted to receive brace or bracket members 47 and 48. The bracket members 47 and 48 have a combined thickness substantially corresponding to the spacing between the flanges 45 and 46 and are positioned whereby the upper faces 49 engage the underface of the plate between the flanges 45 and 46 when in assembled position. Each of the brackets 47 and 48 have ribs 50 on the faces adjacent the flanges 45 and 46, respectively, said ribs being parallel to the faces 49 and spaced slightly therefrom whereby when moved between the flanges said ribs embed therein and tend to brace and hold the arms relative to the plate as well as resisting deflection. The brackets 47 and 48 preferably are of substantially greater height as at 51 adjacent the respective arms and are of a length whereby the free ends substantially engage the innerfaces of the other arms. When the brackets and flanges are engaged and the axle portions welded, the pintle and horn structure is very rigid and capable of withstanding substantial loads.

In the making of a caster structure such as illustrated and described, the pintle and horn are molded in one piece as by injection molding, and preferably of a material such as nylon 6/6 or acetal resin that is capable of high impact resistance so as to withstand impacts that heretofore have caused displacement of material or cold flow in metal horns and stem assemblies. In the molding, the plate 10 and arm portions 4 and 5 are a planar strip with the pintle 7 extending substantially perpendicular therefrom, the flanges 45 and 46, brackets 47 and 48, and axle portions 34 and 38 extend from the strip in the opposite direction from the pintle, as illustrated in FIG. 4. This piece is particularly adapted to be easily molded and removed from the mold, facilitating quantity production. After molding, the pintle and horn structure is subjected to a coining operation wherein two transverse lines are coined as at 52 and 53 which line substantially form the joinder of the side portions of the plate 10 and the arms 4 and 5, respectively. This coining operation is such that it reduces the thickness of the strip at the center of the coined lines to approximately one-half or less of the original thickness of the strip forming the plate and arms, as illustrated in FIG. 5. This provides additional strength and also permits the arms to be swung downwardly to parallel relation. As the arms are being moved relative to the plate 10 a wheel 2 is positioned on one of the axle portions so that when the arms are moved to parallel position the axle portions also are engaged and then are electronically welded. During this same bending operation the brackets 47 and 48 move upwardly between the flanges 45 and 46 with adjacent faces 54 engaged and with the ribs 50 engaged with the flanges 45 and 46 to further hold the arms relative to the plate 10.

It is preferred that the wheel 2 also be made of plastic, as for example, acetal resin or nylon. The sleeve may be of any suitable material and preferably is molded of a resin such as nylon or the like and is sleeved on the pintle 7 with the fingers 24 being spread as they move over the upward portion of the pintle, said fingers snapping into the groove to complete the assembly. In this position, the radius between the flange 18 and bore 19 of the sleeve engages the radius of the pintle adjacent the cylindrical portion thereof, but the radius of the sleeve is less than that of the pintle so that the underface of the flange is spaced from the upper surface of the plate 10 and the bearing points 17 provide the load bearing contact for reduced friction in the swinging action of the caster wherein the pintle rotates in the sleeve.

When assembled into an article of furniture, the sleeve is pressed into a bore 19 with the ribs 20 engaging the wall thereof to hold the sleeve against rotation in the bore, the lower part of the leg engages the upper part of the flange 18, as illustrated in FIG. 3, for proper load distribution thereon, said engagement preferably being above the bearing points 17 of the flange, and with this arrangement, there is a load distribution that cooperates in resisting any deflection, and in providing a long wearing efficient caster with impact resistance. Also, the caster structure has a minimum of parts each of which is easily molded for high production and economical manufacture.

It is to be understood that while I have illustrated and described one form of my invention, it is not to be limited to the specific form or arrangement of parts herein described and shown, except insofar as such limitations are included in the claims.

What I claim and desire to secure by Letters Patent is:

1. In a caster,
  (a) an integral pintle and horn molded of plastic with the pintle extending upwardly from the horn and adapted for rotatable mounting in a furniture leg,
  (b) said horn including a bight at the base of the pintle and spaced arms extending downwardly therefrom,
  (c) axle means on said horn arms and extending therebetween,
  (d) said axle means and arms being secured to retain said arms against spreading,
  (e) a wheel rotatably mounted on said axle means between said arms,
  (f) the connection of the pintle with the horn bight such that the material has a radius equal to from one-half diameter to the diameter of the pintle,
  (g) a sleeve having a tubular portion with longitudinally extending ribs exteriorly of and circumferentially spaced therearound, said sleeve being adapted to fit in a bore in a furniture leg, said sleeve having a bore rotatably receiving the pintle of the caster for mounting same,
  (h) and means on the sleeve engaging said pintle for retaining the pintle assembled in a sleeve.

2. A caster as set forth in claim 1 including,
  (a) an annular flange on said sleeve and having a periphery outwardly from the radius portion of the pintle, (b) said flange having a lower face connected with the bore on a radius lesser than the radius of the pintle, (c) spaced bearing portions on the flange and extending downwardly therefrom for engaging the bight of the horn around the pintle.

3. A caster as set forth in claim 2 wherein the horn and pintle are integral and the sleeve, wheel and integral horn and pintle are cast of nylon.

4. In a caster assembly for mounting a caster wheel,
(a) an integral pintle, horn and axle all of a plastic composition,
(b) said horn being of substantial, inverted U shape with depending arms,
(c) inwardly projecting interengaging parts on said arms and integral therewith for retaining said arms in parallel spaced relation and providing an axle spanning the space between the arms to mount a caster wheel thereon.

5. In a caster of plastic composition comprising:
(a) a molded planar part adapted to form a horn having a depending arm at each end and an upper connecting base,
(b) an upstanding integral pintle on said base,
(c) spaced depending flanges on said base,
(d) an inturned integral bracket on each arm adapted to be received and retained between said flanges,
(e) an integral inwardly projecting axle member on the depending end of each of said spaced arms which when aligned combine to receive a caster wheel.

6. In a caster as set forth in claim 5 wherein the brackets and spaced flanges have interlocking engagement when the arms depend and are positioned in parallel planes and the aligned axle members interengaged to provide an axle for a caster wheel.

7. In a caster of plastic composition comprising:
(a) a molded planar part adapted to form a horn having a depending arm at each end and an upper connecting base,
(b) an upstanding integral pintle on said base,
(c) spaced depending flanges on said base,
(d) an inturned bracket on each arm adapted to be received and retained between said flanges,
(e) an integral inwardly projecting axle member on the depending end of each of said spaced arms which when aligned combine to receive a caster wheel,
(f) said axle projections having telescoping parts which when aligned and assembled are secured in operative position.

8. In a caster,
(a) an integral pintle and horn molded of plastic with the pintle extending upwardly from the horn and adapted for rotatable mounting in a furniture leg,
(b) said horn including a bight at the base of the pintle and spaced arms extending downwardly therefrom,
(c) axle means on said horn arms and extending therebetween, said axle means being in two parts one on each arm, said axle parts being in abutting relation,
(d) means on said arms and integral therewith securing same in parallel relation,
(e) and a wheel rotatably mounted on said axle means between said arms.

9. In a caster,
(a) an integral pintle and horn molded of plastic with the pintle extending upwardly from the horn and adapted for rotatable mounting in a furniture leg,
(b) said horn including a bight at the base of the pintle and spaced arms extending downwardly therefrom,
(c) axle means on said horn arms and extending therebetween,
(d) said axle means and arms being secured to retain said arms against spreading,
(e) a wheel rotatably mounted on said axle means between said arms,
(f) spaced depending flanges on the bight portion of the horn and extending transversely between the spaced arms,
(g) bracket members on said arms and extending between the flanges and having upper faces engaged with said bight,
(h) means cooperatively engaging the bracket members and flanges for facilitating holding the arms parallel,
(i) said pintle and horn being of structural resilient resin material with a connection of the pintle with the horn bight having a radius equal to from one-half the diameter to the diameter of the pintle,
(j) said pintle having a free end and a circumferential groove extending therearound adjacent said free end forming a shoulder facing the horn,
(k) said axle means being in two parts one on each horn arm, said axle parts being in abutting relation with one having an axial bore and the other having a projecting pin extending into the bore and electrically welded to the arm thereof.

References Cited

UNITED STATES PATENTS

| | | | |
|---|---|---|---|
| 186,990 | 2/1877 | Cowell | 16—40 |
| 2,125,292 | 8/1938 | Herold | 16—31 |
| D. 32,224 | 2/1900 | Clark et al. | 16—31 |

BOBBY R. GAY, Primary Examiner

D. C. TROUTMAN, Assistant Examiner